United States Patent
Park et al.

(10) Patent No.: US 12,548,712 B2
(45) Date of Patent: Feb. 10, 2026

(54) MULTILAYER CERAMIC CAPACITOR AND METHOD OF FABRICATING THE SAME

(71) Applicant: SAMSUNG ELECTRO-MECHANICS CO., LTD., Suwon-si (KR)

(72) Inventors: Byung Hyun Park, Suwon-si (KR); Eun Cho, Suwon-si (KR); Byeongjun Jeon, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 100 days.

(21) Appl. No.: 18/592,274

(22) Filed: Feb. 29, 2024

(65) Prior Publication Data

US 2025/0149244 A1    May 8, 2025

(30) Foreign Application Priority Data

Nov. 8, 2023   (KR) .................. 10-2023-0153450

(51) Int. Cl.
*H01G 4/12* (2006.01)
*H01G 4/012* (2006.01)
*H01G 4/30* (2006.01)

(52) U.S. Cl.
CPC .......... *H01G 4/1227* (2013.01); *H01G 4/012* (2013.01); *H01G 4/30* (2013.01)

(58) Field of Classification Search
CPC ......... H01G 4/1227; H01G 4/012; H01G 4/30
See application file for complete search history.

(56) References Cited

U.S. PATENT DOCUMENTS

2014/0175575 A1*  6/2014  Doyle ............... H10N 50/10
                                                     257/421
2015/0340156 A1* 11/2015  Masunari ........... H01G 4/1227
                                                     361/301.4
(Continued)

FOREIGN PATENT DOCUMENTS

CN      106783170 B   *  8/2018    ............ H01G 4/008
JP      2009260200 A  * 11/2009
(Continued)

OTHER PUBLICATIONS

R. Waser et al., "dc Electrical Deagradition of Perovskite-Type Titanates:I, Ceramics," J. Am. Ceram. Soc., 73, (6), 1990, pp. 1645-1653.

(Continued)

*Primary Examiner* — Michael P Mcfadden
(74) *Attorney, Agent, or Firm* — Morgan, Lewis & Bockius LLP

(57) ABSTRACT

A multilayer ceramic capacitor includes: a capacitor body including a dielectric layer and an internal electrode layer; and an external electrode disposed on the capacitor body. The capacitor body includes at least one lost portion defined as a region in which continuity of the internal electrode layer is disconnected, and the lost portion includes a Mg concentrated region including magnesium (Mg) as a main element. The dielectric layer includes an interface adjacent region defined to be a region from an interface of the dielectric layer and the internal electrode layer to a depth surface of 80 nm to 100 nm into the dielectric layer, and the interface adjacent region includes magnesium (Mg). The magnesium (Mg) included in the interface adjacent region of the dielectric layer has a lower atom % content than the magnesium (Mg) included in the Mg concentrated region of the lost portion.

15 Claims, 9 Drawing Sheets

(56) References Cited

U.S. PATENT DOCUMENTS

| | | | |
|---|---|---|---|
| 2015/0364259 A1* | 12/2015 | Kanzaki | C04B 35/4682 361/301.4 |
| 2017/0018363 A1* | 1/2017 | Tanaka | H01G 4/232 |
| 2018/0261390 A1* | 9/2018 | Sakate | H01G 4/30 |
| 2021/0035736 A1 | 2/2021 | Cha et al. | |
| 2022/0270822 A1* | 8/2022 | Baik | H01G 4/30 |

FOREIGN PATENT DOCUMENTS

| | | | |
|---|---|---|---|
| KR | 20080084601 A * | 9/2008 | C04B 35/4682 |
| KR | 10-1535757 B1 | 7/2015 | |
| KR | 10-1687576 A | 12/2016 | |
| KR | 10-2019-0116144 A | 10/2019 | |

OTHER PUBLICATIONS

R. Waser et al., "dc Electrical Degradation of Perovskite-Type Titanates: II, Single Crystals," J. Am. Ceram. Soc., 73, (6), 1990, pp. 1654-1662.

Seok-Hyun Yoon et al., "Effect of acceptor (Mg) concentration on the electrical resistance at room and high temperatures of acceptor (Mg)-doped ceramics," Journal of Applied Physics 102, 054105, 2007, pp. 1-9.

\* cited by examiner

MULTILAYER CERAMIC CAPACITOR AND METHOD OF FABRICATING THE SAME

CROSS-REFERENCE TO RELATED APPLICATION

This application claims priority to and the benefit of Korean Patent Application No. 10-2023-0153450 filed in the Korean Intellectual Property Office on Nov. 8, 2023, the entire contents of which are incorporated herein by reference.

TECHNICAL FIELD

The present disclosure relates to a multilayer ceramic capacitor and a method of fabricating the same.

BACKGROUND

Electronic components using ceramic materials include capacitors, inductors, piezoelectric elements, varistors, or thermistors. Among such ceramic electronic components, a multilayer ceramic capacitor (MLCC) may be used in various electronic devices due to its small size, high capacity, and easy mounting.

For example, the multilayer ceramic capacitor may be used for chip-type capacitors that are mounted in boards of various electronic products to charge or discharge electricity, including imaging devices such as liquid crystal displays (LCD), plasma display panels (PDP), and organic light-emitting diode (OLED) displays, computers, personal portable terminals, and smartphones.

Recently, the multilayer ceramic capacitor demands high performance and down-sizing. To implement a high-capacity and small multilayer ceramic capacitor, it is required to thin a dielectric layer. To secure reliability characteristics in design conditions of dielectric thin layers, uniform distribution of additives and control of grain growth are important, and distribution and content ratio control of additive elements that contribute to reliability improvement are important.

SUMMARY

The present disclosure attempts to provide a multilayer ceramic capacitor with excellent accelerated life reliability.

The present disclosure attempts to provide a method of fabricating the multilayer ceramic capacitor.

An embodiment of the present disclosure provides a multilayer ceramic capacitor including: a capacitor body including a dielectric layer and an internal electrode layer; and an external electrode disposed on the capacitor body. The capacitor body includes at least one lost portion defined as a region in which continuity of the internal electrode layer is disconnected, and the lost portion includes a Mg concentrated region including magnesium (Mg) as a main element, the dielectric layer includes an interface adjacent region defined to be a region from an interface of the dielectric layer and the internal electrode layer to a depth surface of 80 nm to 100 nm into the dielectric layer, and the interface adjacent region includes magnesium (Mg), and the magnesium (Mg) included in the interface adjacent region of the dielectric layer has a lower atom % content than the magnesium (Mg) included in the Mg concentrated region of the lost portion.

The magnesium (Mg) included in the Mg concentrated region of the lost portion may be included in an amount of 1.6 atom % to 11.1 atom % based on a total amount of components of the Mg concentrated region.

The Mg concentrated region of the lost portion may further include barium (Ba), titanium (Ti), nickel (Ni), dysprosium (Dy), terbium (Tb), manganese (Mn), vanadium (V), aluminum (Al), silicon (Si), tin (Sn), oxygen (O), or combinations thereof.

The Mg concentrated region of the lost portion may include the titanium (Ti), and the magnesium (Mg) included in the Mg concentrated region of the lost portion may be included in an amount of 12.68 parts by mole to 22000 parts by mole based on 100 parts by mole of the titanium (Ti) in the Mg concentrated region of the lost portion.

The Mg concentrated region of the lost portion may include the nickel (Ni), and the magnesium (Mg) included in the Mg concentrated region of the lost portion may be included in an amount of 4.75 parts by mole to 71.58 parts by mole based on 100 parts by mole of the nickel (Ni) in the Mg concentrated region of the lost portion.

The magnesium (Mg) included in the Mg concentrated region of the lost portion may be included in a mole ratio of 1.010 to 13.701 compared to the magnesium (Mg) included in the interface adjacent region of the dielectric layer. The magnesium (Mg) included in the Mg concentrated region of the lost portion and at least one of nickel (Ni) and oxygen (O) may have a secondary phase.

The magnesium (Mg) included in the interface adjacent region of the dielectric layer may be included in an amount of 0.8 atom % to 4.2 atom % based on a total amount of components of the interface adjacent region.

The interface adjacent region of the dielectric layer may further include barium (Ba), titanium (Ti), nickel (Ni), dysprosium (Dy), terbium (Tb), manganese (Mn), vanadium (V), aluminum (Al), silicon (Si), tin (Sn), oxygen (O), or combinations thereof.

The interface adjacent region of the dielectric layer may include the titanium (Ti), and the magnesium (Mg) included in the interface adjacent region of the dielectric layer may be included in an amount of 5.0 parts by mole to 29.7 parts by mole based on 100 parts by mole of the titanium (Ti) of the interface adjacent region of the dielectric layer.

Another embodiment of the present disclosure provides a method for fabricating a multilayer ceramic capacitor including: preparing dielectric slurry by mixing a barium titanate-based main component powder and a secondary component powder including a magnesium (Mg)-containing compound;

fabricating a dielectric green sheet by using the dielectric slurry, and forming a conductive paste layer on a surface of the dielectric green sheet; fabricating a dielectric green sheet laminate by laminating the dielectric green sheet on which the conductive paste layer is formed; fabricating a capacitor body including a dielectric layer and an internal electrode layer by firing the dielectric green sheet laminate; and forming an external electrode on one side of the capacitor body. The capacitor body includes at least one lost portion defined as a region in which continuity of the internal electrode layer is disconnected, and the lost portion includes a Mg concentrated region including magnesium (Mg) as a main element, the dielectric layer includes an interface adjacent region defined to be a region from an interface of the dielectric layer and the internal electrode layer to a depth surface of 80 nm to 100 nm into the dielectric layer, and the interface adjacent region includes magnesium (Mg), and the magnesium (Mg) included in the interface adjacent region of the dielectric layer has a lower atom % content than the magnesium (Mg) included in the Mg concentrated region of the lost portion.

The magnesium (Mg)-containing compound may be mixed in an amount of 0.01 parts by mole to 3 parts by mole based on 100 parts by mole of the barium titanate-based main component powder.

The secondary component powder may further include a dysprosium (Dy)-containing compound, a terbium (Tb)-containing compound, a manganese (Mn)-containing compound, a vanadium (V)-containing compound, an aluminum (Al)-containing compound, a silicon (Si)-containing compound, a tin (Sn)-containing compound, or combinations thereof.

Based on 100 parts by mole of the barium titanate-based main component powder, the dysprosium (Dy)-containing compound may be included in an amount of 0.01 parts by mole to 5 parts by mole, the terbium (Tb)-containing compound may be included in an amount of 0.01 parts by mole to 5 parts by mole, the manganese (Mn)-containing compound may be included in an amount of 0.01 parts by mole to 5 parts by mole, the vanadium (V)-containing compound may be included in an amount of 0.01 parts by mole to 5 parts by mole, the aluminum (Al)-containing compound may be included in an amount of 0.01 parts by mole to 5 parts by mole, the silicon (Si)-containing compound may be included in an amount of 0.01 parts by mole to 5 parts by mole, and the tin (Sn)-containing compound may be included in an amount of 0.01 parts by mole to 5 parts by mole.

The conductive paste layer may be fabricated from a conductive paste including nickel (Ni).

Another embodiment of the present disclosure provides a method for fabricating a multilayer ceramic capacitor including: preparing dielectric slurry by mixing a barium titanate-based main component powder and a secondary component powder including a magnesium (Mg)-containing compound; fabricating a dielectric green sheet by using the dielectric slurry, and forming a conductive paste layer on a surface of the dielectric green sheet; fabricating a dielectric green sheet laminate by laminating the dielectric green sheet on which the conductive paste layer is formed; fabricating a capacitor body including a dielectric layer and an internal electrode layer by firing the dielectric green sheet laminate; and forming an external electrode on one side of the capacitor body. The firing the dielectric green sheet laminate is performed in conditions of a firing temperature of 1150° C. to 1250° C. and hydrogen ($H_2$) concentration of 0.8% or lower.

The multilayer ceramic capacitor according to the embodiment increases the accelerated life reliability because of the increase of the potential barrier height at the interface of the dielectric layer and the internal electrode layer.

DETAILED DESCRIPTION OF THE EMBODIMENTS

Figure 1:
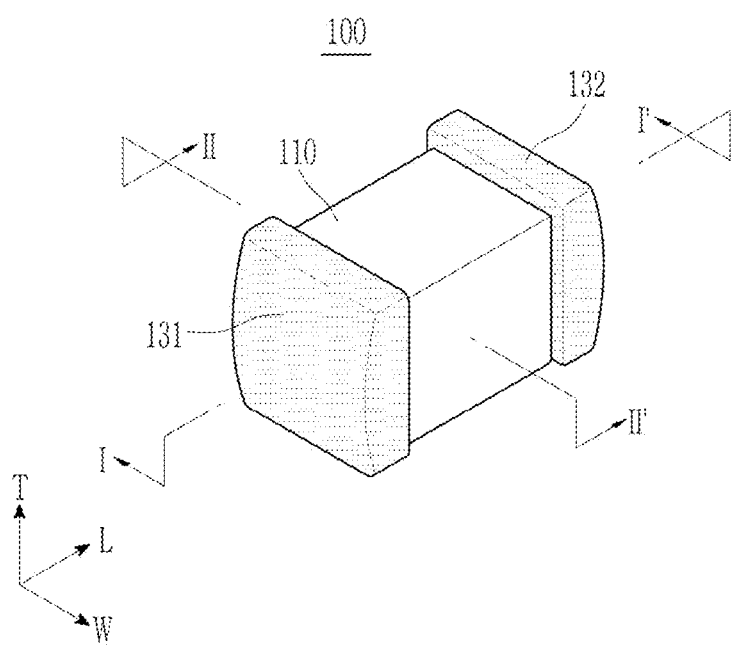
FIG. 1 shows a perspective view on a multilayer ceramic capacitor according to an embodiment.

The present disclosure will be described more fully hereinafter with reference to the accompanying drawings, in which embodiments of the disclosure are shown. The drawings and description are to be regarded as illustrative in nature and not restrictive. Like reference numerals designate like elements throughout the specification. Some constituent elements are exaggerated, omitted, or briefly illustrated in the added drawings, and sizes of the respective constituent elements do not reflect the actual sizes.

The accompanying drawings are provided only in order to allow embodiments disclosed in the present specification to be easily understood and are not to be interpreted as limiting the spirit disclosed in the present specification, and it is to be understood that the present invention includes all modifications, equivalents, and substitutions without departing from the scope and spirit of the present invention.

Terms including ordinal numbers such as first, second, and the like will be used only to describe various constituent elements, and are not to be interpreted as limiting these constituent elements. The terms are only used to differentiate one constituent element from other constituent elements.

It will be understood that when an element such as a layer, film, region, or substrate is referred to as being "on" another element, it can be directly on the other element or intervening elements may also be present. In contrast, when an element is referred to as being "directly on" another element, there are no intervening elements present. The word "on" or "above" means positioned on or below the object portion, and does not necessarily mean positioned on the upper side of the object portion based on a gravitational direction.

It should be understood that the term "include", "comprise", "have", or "configure" indicates that a feature, a number, a step, an operation, a constituent element, a part, or a combination thereof described in the specification is present, but does not exclude a possibility of presence or addition of one or more other features, numbers, steps, operations, constituent elements, parts, or combinations, in advance. Unless explicitly described to the contrary, the word "comprise" and variations such as "comprises" or "comprising" will be understood to imply the inclusion of stated elements but not the exclusion of any other elements.

The phrase "in a plan view" or "on a plane" means viewing a target portion from the top, and the phrase "in a cross-sectional view" or "on a cross-section" means viewing a cross-section formed by perpendicularly cutting a target portion from the side.

Throughout the specification, when it is described that a part is "connected" to another part, the part may be "directly connected" to the other element, may be "connected" to the other part through a third part, or may be connected to the other part physically or electrically, and may be referred to by different titles depending on positions or functions, but respective portions that are substantially integrated into one body may be connected to each other.

A multilayer ceramic capacitor according to an embodiment will now be described with reference to FIG. 1 to FIG. 4.

Figure 2:
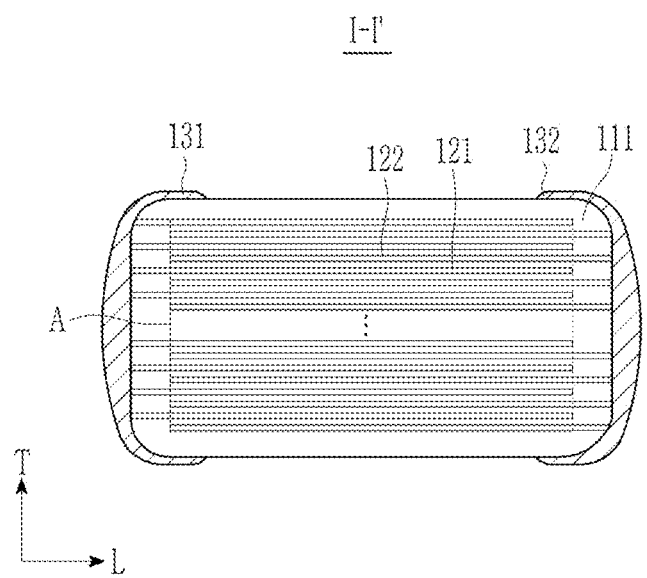
FIG. 2 shows a cross-sectional view of a multilayer ceramic capacitor with respect to a line I-I' of FIG. 1.
Figure 3:
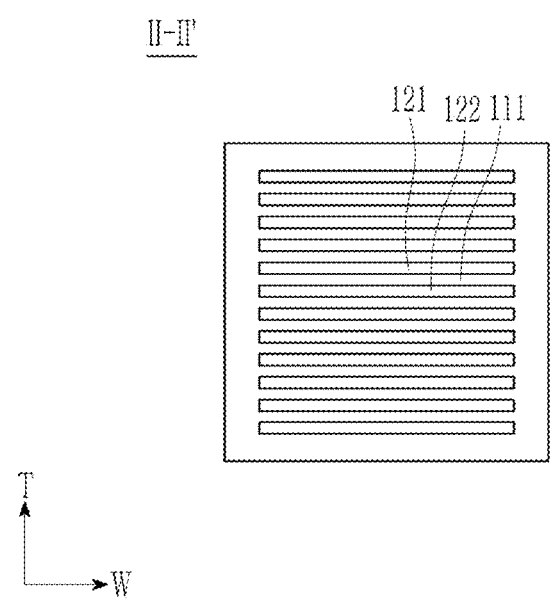
FIG. 3 shows a cross-sectional view of a multilayer ceramic capacitor with respect to a line II-II' of FIG. 1.
Figure 4:
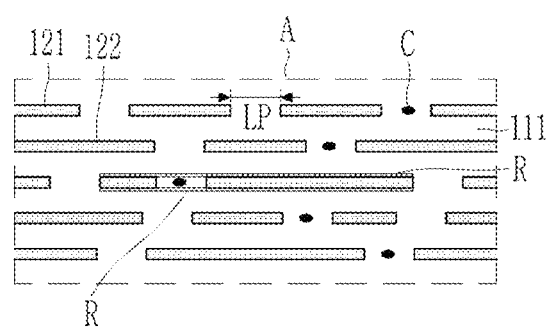
FIG. 4 shows a schematic diagram on a portion of an active region A in FIG. 2.

FIG. 1 shows a perspective view on a multilayer ceramic capacitor according to an embodiment, FIG. 2 shows a cross-sectional view of a multilayer ceramic capacitor with respect to a line I-I' of FIG. 1, FIG. 3 shows a cross-sectional view of a multilayer ceramic capacitor with respect to a line II-II' of FIG. 1, and FIG. 4 shows a schematic diagram on a portion of an active region A in FIG. 2.

An L-axis, a W-axis, and a T-axis shown in FIG. 1 to FIG. 4 represent a length direction, a width direction, and a thickness direction of a capacitor body 110, respectively. Here, the thickness direction (T-axis direction) may be a direction perpendicular to a wide surface (main surface) of the constituent elements in a sheet shape, and may for example be used as a same concept as the multilayer direction in which the dielectric layer 111 is laminated. The length direction (L-axis direction) may be a direction that extends parallel to a broad surface (main surface) of the constituent elements in the sheet shape and may be a direction approximately perpendicular to the thickness direction (T-axis direction), for example, it may be the direction in which the first external electrode 131 and the second external electrode 132 are disposed on respective sides. The width direction (W-axis direction) may be a direction that extends parallel to the broad surface (main surface) of the constituent elements in the sheet shape and may be a direction that is approximately perpendicular to the thickness direction (T-axis direction) and the length direction (L-axis direction), and the length of the constituent elements in the sheet shape in the length direction (L-axis direction) may be greater than the length in the width direction (W-axis direction).

Referring to FIG. 1 to FIG. 4, the multilayer ceramic capacitor 100 according to an embodiment includes a capacitor body 110, and external electrodes 131 and 132 disposed outside the capacitor body 110. The external electrodes 131 and 132 may include a first external electrode 131 and a second external electrode 132 disposed at respective ends opposing in the length direction (L-axis direction) of the capacitor body 110.

Capacitor Body

As an example, the capacitor body 110 may have an approximate hexahedral shape.

For better understanding and ease of description of an embodiment, respective sides of the capacitor body 110 facing each other in the thickness direction (T-axis direction) will be defined to be a first side and a second side, respective sides connected to the first side and the second side and facing each other in the length direction (L-axis direction) will be defined to be a third side and a fourth side, and respective sides connected to the first and second sides, connected to the third and fourth sides, and facing each other in the width direction (W axis direction) will be defined to be a fifth side and a sixth side.

For example, the first side, which is a lower surface, may be the side facing a mounting direction. Additionally, the first to sixth sides may be flat, and the embodiment is not limited thereto. For example, the first to sixth sides may be curved surfaces of which central portions are convex, and edges that are boundaries of the respective sides may be round.

The shape and dimensions of the capacitor body 110 and the number of multilayers of the dielectric layer 111 are not limited to those shown in the drawing of the present embodiment.

The capacitor body 110 includes dielectric layers 111 and internal electrode layers 121 and 122. Specifically, the capacitor body 110 includes dielectric layers 111 and a first internal electrode 121 and a second internal electrode 122 alternately arranged in the thickness direction (T-axis direction) with the dielectric layer 111 interposed therebetween.

At this time, the boundary between the adjacent dielectric layers 111 of the capacitor body 110 may be integrated to the extent that it is difficult to check without using a scanning electron microscope (SEM).

The capacitor body 110 may have an active region A. The active region A contributes to formation of capacity of the multilayer ceramic capacitor 100. For example the active region A may be a region where the first internal electrode 121 and the second internal electrode 122 laminated in the thickness direction (T-axis direction) overlap.

The capacitor body 110 may further include a cover region and a side margin region.

The cover region may be a thickness direction margin and may be disposed on the first side and the second side of the active region A in the thickness direction (T-axis direction), respectively. This cover region may be a single dielectric layer 111 or two or more dielectric layers 111 laminated on the upper and lower surfaces of the active region A, respectively.

The side margin region may be a width direction margin and may be disposed on the fifth side and the sixth side of the active region in the width direction (W-axis direction), respectively. The side margin region may be formed by applying a conductive paste layer in a predetermined region of the dielectric green sheet surface, laminating dielectric green sheets on which the conductive paste layer is not applied on respective lateral sides of the dielectric green sheet surface, and firing the same when applying a conductive paste layer for the internal electrode on a surface of the dielectric green sheet.

The cover region and the side margin region serve to prevent damages to the first internal electrode 121 and the second internal electrode 122 due to physical or chemical stresses.

The first internal electrode 121 and the second internal electrode 122 may have different polarities, may be arranged alternately to face each other in the T-axis direction with the dielectric layer 111 therebetween, and one ends may be respectively exposed through the third and fourth sides of the capacitor body 110.

The first internal electrode 121 and the second internal electrode 122 may be electrically insulated from each other by the dielectric layer 111 disposed therebetween.

The ends of the first internal electrode 121 and the second internal electrode 122, which are alternately exposed through the third and fourth sides of the capacitor body 110, may be connected to the first external electrode 131 and the second external electrode 132 respectively, and the ends of the first internal electrode 121 may thus be electrically connected to each other and the ends of the second internal electrode 122 may thus be electrically connected to each other.

The first internal electrode 121 and the second internal electrode 122 include a conductive metal, for example, they may include metals, such as Ni, Cu, Ag, Pd, and Au, or alloys thereof, such as an alloy of Ag—Pd.

Additionally, the first internal electrode 121 and the second internal electrode 122 may include dielectric particles of the same composition as the ceramic material included in the dielectric layer 111.

The first internal electrode 121 and the second internal electrode 122 may be formed using a conductive paste including a conductive metal. A method for printing the conductive paste may use a screen printing or a gravure printing.

Referring to FIG. 4, the internal electrode layers 121 and 122 according to an embodiment include at least one lost portion LP defined as a region in which the continuity of the internal electrode layer is lost. For example, the lost portion LP may be two or more in one internal electrode layer, for example 2 to 300, or for example 2 to 180. For example, the number of the lost portion LP may be 2 to 300 with respect to an LT cross section (a length direction-thickness direction cross section), and the number thereof may be 2 to 180 with respect to a WT cross section (a width direction-thickness direction cross section).

The capacitor body 110 may be formed by firing a laminate in which dielectric layers and internal electrode layers are laminated in the thickness direction (T-axis direction). At this time, as the metal-based internal electrode layer is fired at a relatively lower temperature than the dielectric layer of a ceramic material, the internal electrode layer may be overfired and may shrink excessively when the dielectric layer is fired, thereby causing breakage. Accordingly, the internal electrode layers 121 and 122 have a disconnected portion, that is, the lost portion LP.

The lost portion LP includes a Mg concentrated region C containing magnesium (Mg) as a main element. Specifically, the lost portion LP may include nickel (Ni) used as a main element when forming the internal electrode layers 121 and 122, and various components caused by the movement and diffusion of main and secondary components used when forming the dielectric layer 111. The lost portion LP includes a Mg concentrated region C including magnesium (Mg) as the main element. The Mg concentrated region C may be a region in which the concentration of the element of Mg increases in the lost portion LP. Additionally, the Mg concentrated region C may be a region having Mg concentration higher than a region in the lost portion LP that surrounds the Mg concentrated region.

According to an embodiment, when the Mg concentrated region C exists in the lost portion LP of the internal electrode layers 121 and 122, the concentration of Mg in the dielectric layer 111 is reduced at the interface of the dielectric layer 111 and the internal electrode layers 121 and 122 so the element of Mg in the dielectric material may be suppressed from being excessively employed as an acceptor. In addition, as the oxygen vacancy concentration decreases due to the suppression of the excessive employment of Mg in the dielectric material, a potential barrier height at the interface of the dielectric layer 111 and the internal electrode layers 121 and 122 increases, and thus accelerated life reliability may be improved.

In detail, the Mg concentrated region C may include 1.6 atom % to 11.1 atom % of magnesium (Mg) with respect to the total amount of components existing in the Mg concentrated region C, for example, it may include 2.0 atom % to 10.0 atom % thereof. When the lost portion of the internal electrode layer has a Mg concentrated region C in which the magnesium (Mg) exists in the concentration range, accelerated life reliability may be improved due to an increase of the potential barrier height at the interface of the dielectric layer and the internal electrode layer.

In addition, the Mg concentrated region C of the lost portion LP may further include barium (Ba), titanium (Ti), nickel (Ni), dysprosium (Dy), terbium (Tb), manganese (Mn), vanadium (V), aluminum (Al), silicon (Si), tin (Sn), oxygen (O), or combinations thereof. Here, barium (Ba) and titanium (Ti) may be derived from the main element material used when forming the dielectric layer 111, and may move and diffuse to the lost portion LP of the internal electrode layers 121 and 122. In addition, dysprosium (Dy), terbium (Tb), manganese. (Mn), vanadium (V), aluminum (Al), silicon (Si), and tin (Sn) may be derived from secondary component materials used in forming the dielectric layer 111, and they may move and diffuse to the lost portion LP of the internal electrode layers 121 and 122. Nickel (Ni) may be derived from the main element material used in forming the internal electrode layers 121 and 122.

For example, the Mg concentrated region C of the lost portion LP may include magnesium (Mg) and titanium (Ti). In this case, the magnesium (Mg) included in the Mg concentrated region C may be 12.68 parts by mole or more based on 100 parts by mole of titanium (Ti), for example, it may be 12.68 parts by mole to 22000 parts by mole, or 15 parts by mole to 20000 parts by mole. When the magnesium (Mg) is included in the content range within the Mg concentrated region C, excellent accelerated life reliability may be achieved because of an increase in the potential barrier height at the interface of the dielectric layer and the internal electrode layer.

For another example, the Mg concentrated region C of the lost portion LP may include magnesium (Mg) and nickel (Ni). In this case, the magnesium (Mg) included in the Mg concentrated region C may be included in an amount of 4.75 parts by mole to 71.58 parts by mole based on 100 parts by mole of nickel (Ni), for example, 5.0 parts by mole to 60.0 parts by mole thereof may be included. When the magnesium (Mg) is included within the content range in the Mg concentrated region C, excellent accelerated life reliability may be achieved because of the increase in the potential barrier height at the interface of the dielectric layer and the internal electrode layer.

The magnesium (Mg) included in the Mg concentrated region C of the lost portion LP may be included at a mole ratio of 1.010 to 13.701 compared to the magnesium (Mg) included in the interface adjacent region R of the dielectric layer 111, for example, it may be included at the mole ratio of 1.1 to 11.0. When the mole ratio of magnesium (Mg) in the Mg concentrated region C and the interface adjacent region R is within the range, the oxygen vacancy concentration decreases as the Mg element in the dielectric layer 111 suppresses phenomenon of the excessive employment as an acceptor. Accordingly, the potential barrier height at the interface of the dielectric layer 111 and the internal electrode layers 121 and 122 increases, and accelerated life reliability may be improved accordingly.

The magnesium (Mg) included in the Mg concentrated region C of the lost portion LP may form a secondary phase by combining with at least one of nickel (Ni) and oxygen (O). When magnesium (Mg) takes the form of a secondary phase with at least one of nickel (Ni) and oxygen (O), it reduces the concentration of Mg in the dielectric layer 111 at the interface of the dielectric layer 111 and the internal electrode layers 121 and 122, thereby suppressing the excessive employment of the element of Mg in the dielectric layer 111 as an acceptor.

An average thickness of the first internal electrode 121 and the second internal electrode 122 may be 0.1 μm to 2 μm. This may be found by setting a center point of the first internal electrode 121 or the second internal electrode 122 in a length direction (L-axis direction) or a width direction (W-axis direction) as a reference point in a scanning electron microscope (SEM) image of a measured cross-sectional sample as described above, and finding an arithmetic mean value of the thickness of the first internal electrode 121 or the second internal electrode 122 at ten points spaced from the reference point at predetermined intervals.

Gaps among ten points may be adjusted according to a scale of a scanning electron microscope (SEM) image, for example, 1 µm to 100 µm, 1 µm to 50 µm, or 1 µm to 10 µm. At this time, the ten points must be disposed in the first internal electrode 121 or the second internal electrode 122, and when the ten points are not disposed in the first internal electrode 121 or the second internal electrode 122, a position of a reference point may be changed or the gaps among the ten points may be adjusted.

The dielectric layer 111 may include a barium titanate-based main ingredient including barium (Ba) and titanium (Ti).

The barium titanate-based main ingredient is a dielectric base material, has a high dielectric constant, and contributes to the formation of the dielectric constant of the multilayer ceramic capacitor 100.

For example, the barium titanate-based main ingredient may include, for example, $BaTiO_3$, $Ba(Ti, Zr)O_3$, $Ba(Ti, Sn)O_3$, $(Ba, Ca)TiO_3$, $(Ba, Ca)(Ti, Zr)O_3$, $(Ba, Ca)(Ti, Sn)O_3$, $(Ba, Sr)TiO_3$, $(Ba, Sr)(Ti, Zr)O_3$, $(Ba, Sr)(Ti, Sn)O_3$, or combinations thereof.

The dielectric layer 111 may further include a secondary component including magnesium (Mg). The secondary component may, for example, further include dysprosium (Dy), terbium (Tb), manganese (Mn), vanadium (V), aluminum (Al), silicon (Si), tin (Sn), or combinations thereof in addition to magnesium (Mg), but is not limited thereto.

The dielectric layer 111 may include the interface adjacent region R defined to be the region from the interface of the dielectric layer 111 and the internal electrode layers 121 and 122 to a depth surface of 80 nm to 100 nm into the dielectric layer 111. The interface adjacent region R may, for example, be disposed near the Mg concentrated region C of the lost portion LP.

The interface adjacent region R of the dielectric layer 111 includes magnesium (Mg).

The magnesium (Mg) included in the interface adjacent region R of the dielectric layer 111 may have a lower content of atom % than the magnesium (Mg) included in the Mg concentrated region C of the lost portion LP. This is because the concentration of Mg in the dielectric layer 111 is reduced in the interface adjacent region R of the dielectric layer 111 disposed near the Mg concentrated region C according to the formation of the Mg concentrated region C of the lost portion LP. Hence, when the magnesium (Mg) included in the interface adjacent region R has a lower content of atom % than the magnesium (Mg) included in the Mg concentrated region C, the phenomenon for the element of Mg in the dielectric layer 111 to be excessively employed as an acceptor may be suppressed. Further, as the reduction of the oxygen vacancy concentration caused by suppressing the excessive employment of Mg in the dielectric layer 111 results in the increase of the potential barrier height at the interface of the dielectric layer 111 and the internal electrode layers 121 and 122, thereby improving the accelerated life reliability.

The interface adjacent region R of the dielectric layer 111 may include 0.8 atom % to 4.2 atom % of the magnesium (Mg) based on the total amount of the components existing in the interface adjacent region R, for example, 1.0 atom % to 3.5 atom %. This is because the concentration of Mg in the dielectric layer 111 is reduced in the interface adjacent region R of the dielectric layer 111 disposed near the Mg concentrated region C according to the formation of the Mg concentrated region C on the lost portion LP of the internal electrode layers 121 and 122. Hence, when the magnesium (Mg) in the interface adjacent region R has the content range, the phenomenon for the element of Mg in the dielectric layer 111 to be excessively employed as an acceptor may be suppressed, and the potential barrier height increases at the interface, thereby improving the accelerated life reliability.

The interface adjacent region R of the dielectric layer 111 may further include barium (Ba), titanium (Ti), nickel (Ni), dysprosium (Dy), terbium (Tb), manganese (Mn), vanadium (V), aluminum (Al), silicon (Si), tin (Sn), oxygen (O), or combinations thereof. Deriving of the components corresponds to the description on the components included in the Mg concentrated region C of the lost portion LP.

For example, the interface adjacent region R of the dielectric layer 111 may include magnesium (Mg) and titanium (Ti). In this case, the magnesium (Mg) included in the interface adjacent region R may be included in an amount of 5.0 parts by mole to 29.7 parts by mole based on 100 parts by mole of titanium (Ti), for example, it may be included in an amount of 8.0 parts by mole to 25.0 parts by mole. When the magnesium (Mg) is included within the content range in the interface adjacent region R, the potential barrier height at the interface of the dielectric layer and the internal electrode layer increases, thereby having excellent accelerated life reliability.

An average thickness (an average length in the T-axis direction) of the dielectric layer 111 may be 0.2 µm to 8.0 µm, for example, 2.4 µm to 7.8 µm. When the average thickness of the dielectric layer 111 is within the range, reliability of the multilayer ceramic capacitor is excellent. This may be found by setting a center point of the dielectric layer 111 in the length direction (L-axis direction) or the width direction (W-axis direction) as a reference point in the scanning electron microscope (SEM) image of a measured cross-sectional sample as described above, and finding an arithmetic mean value of the thickness of the dielectric layer 111 at ten points spaced from the reference point at predetermined intervals. The gaps among ten points may be adjusted according to a scale of a scanning electron microscope (SEM) image, for example, 1 µm to 100 µm, 1 µm to 50 µm, or 1 µm to 10 µm. At this time, the ten points must be disposed in the dielectric layer 111, and when the ten points are not disposed in the dielectric layer 111, the position of the reference point may be changed or the gaps among the ten points may be adjusted.

For reference, FIG. 4 is given to help understand the lost portion LP, the Mg concentrated region C, and the interface adjacent region R, and for ease of description, the lost portion LP, the Mg concentrated region C, and the interface adjacent region R are shown in some of the drawing, and the drawing is not limited thereto. That is, the region of which the continuity is disconnected in the internal electrode layers 121 and 122 may be the lost portion LP, the regions including the element of Mg as a main element in the lost portion LP or the regions in which the concentration of the element of Mg increases may be the Mg concentrated region C, and the interface adjacent region R may be disposed in any places where the interface of the dielectric layer 111 and the internal electrode layers 121 and 122 is placed, and may also be disposed on other sides in addition to one side of the one internal electrode layer.

According to an embodiment, the element of Mg existing in the Mg concentrated region C formed on the lost portion LP of the internal electrode layers 121 and 122 and the interface adjacent region R of the dielectric layer 111 and the content of Mg may be checked by a transmission electron microscope-energy dispersive spectrometer (TEM-EDS) analysis.

In detail, the multilayer ceramic capacitor 100 may be supplied into an epoxy mixed solution to be cured, the surface (LT surface) of the capacitor body 110 in the L-axis and T-axis directions may be polished in the W-axis direction by up to the ½ depth, it may be fixed, it may be maintained in a vacuum atmosphere chamber, and its cross-sectional sample may be obtained to observe an active region A where the dielectric layer 111 rosses the internal electrode layers 121 and 122. The active region A of the cross-sectional sample, for example, an upper portion, a center portion, and a lateral portion of the active region may be measured with the transmission electron microscope (TEM). The transmission electron microscope may be performed by using a focused ion beam (Xe-FIB) in the condition of an accelerating voltage of 200 kV and analysis magnification of $110k$ times, and may measure so that at least one layer of the respective dielectric layer 111 and the internal electrode layers 121 and 122, for example, three layers to one hundred layers or five layers to fifty layers may be shown. The existence and the content of the element of magnesium (Mg) may be checked from the transmission electron microscope (TEM) image of the measured cross-sectional sample according to an EDS analysis. In detail, the formation of the Mg concentrated region C in the lost portion LP of the internal electrode layers 121 and 122 may be checked, and the content of the element of magnesium (Mg) existing in the interface adjacent region R of the Mg concentrated region C and the dielectric layer 111 may be checked. The content of the element of Mg may be an average value measured on at least one point of the respective upper portion, the center portion, and the lateral portion of the active region, for example two points, three points, or five points.

External Electrode

The first external electrode 131 and the second external electrode 132 are provided with voltages of different polarities, and may be electrically connected to exposed portions of the first internal electrode 121 and the second internal electrode 122, respectively.

According to the above configuration, when a predetermined voltage is applied to the first external electrode 131 and the second external electrode 132, charges may be accumulated between the first internal electrode 121 and the second internal electrode 122 facing each other. At this time, the capacitance of the multilayer ceramic capacitor 100 is proportional to the overlapped area of the first internal electrode 121 and the second internal electrode 122 that overlap each other in the T-axis direction in the active region.

The first external electrode 131 and the second external electrode 132 may include first and second connection portions respectively disposed on the third and fourth sides of the capacitor body 110 and connected to the first internal electrode 121 and the second internal electrode 122, and first and second band portions arranged at corners where the third and fourth sides, the first and second sides, or the fifth and sixth sides of the capacitor body 110 meet.

The first and second band portions may extend from the first and second connection portions to portions of the first and second sides or the fifth and sixth sides of the capacitor body 110, respectively. The first and second band portions may serve to improve the adhesion strength of the first external electrode 131 and the second external electrode 132.

The first external electrode 131 and the second external electrode 132 may include a sintered metal layer in contact with the capacitor body 110, a conductive resin layer disposed to cover the sintered metal layer, and a plating layer disposed to cover the conductive resin layer, respectively.

The sintered metal layer may include a conductive metal and glass.

The conductive metal may include copper (Cu), nickel (Ni), silver (Ag), palladium (Pd), gold (Au), platinum (Pt), tin (Sn), tungsten (W), titanium (Ti), lead (Pb), alloys thereof, or combinations thereof, and for example, the copper (Cu) may include an alloy of copper (Cu). When the conductive metal contains copper, metals other than the copper may be included in equal to or less than 5 parts by mole for 100 parts by mole of copper.

The glass may include a composition of mixed oxides, and may be at least one of, for example, a silicon oxide, a boron oxide, an aluminum oxide, a transition metal oxide, an alkali metal oxide, and an alkaline-earth metal oxide. The transition metal may be selected from among zinc (Zn), titanium (Ti), copper (Cu), vanadium (V), manganese (Mn), iron (Fe), and nickel (Ni), the alkali metal may be selected from among lithium (Li), sodium (Na), and potassium (K), and the alkaline-earth metal may be selected from among magnesium (Mg), calcium (Ca), strontium (Sr), and barium (Ba).

Optionally, the conductive resin layer may be formed on the sintered metal layer and, for example, may be formed to completely cover the sintered metal layer. Meanwhile, the first external electrode 131 and the second external electrode 132 may not include the sintered metal layer, and in this case, the conductive resin layer may contact the capacitor body 110.

The conductive resin layer may extend to the first and second sides or the fifth and sixth sides of the capacitor body 110, and the conductive resin layer may extend to the first and second sides or the fifth and sixth sides of the capacitor body 110 so a length of the arranged region (i.e., band portion) may be longer than the length of the region (i.e., band portion) in which the sintered metal layer extends to the first and second sides or the fifth and sixth sides of the capacitor body 110. In other words, the conductive resin layer may be formed on the sintered metal layer and may cover the sintered metal layer.

The conductive resin layer includes resin and a conductive metal.

The resin included in the conductive resin layer is not particularly limited as long as it has junction and impact absorption properties and is mixed with conductive metal powder to make a paste, for example, it may include phenol resin, acryl resin, silicone resin, epoxy resin, or polyimide resin.

The conductive metal included in the conductive resin layer serves to be electrically connected to the first internal electrode 121 and the second internal electrode 122 or the sintered metal layer.

The conductive metal included in the conductive resin layer may have a spherical shape, a flake shape, or a combination thereof. That is, the conductive metal may be made in the flake form, the spherical shape, or a mixture of the flake form and the spherical shape.

Here, the spherical shape may include a shape that is not a complete spherical shape, and, for example, may include a shape in which the length ratio (long axis/short axis) of a long axis to a short axis may be 1.45 or less. The flake-type powder may refer to powder with flat and long shapes, and it is not particularly limited, but for example, the length ratio (long axis/short axis) of the long axis to the short axis may be 1.95 or more.

The first external electrode 131 and the second external electrode 132 may further include a plating layer disposed outside the conductive resin layer.

The plating layer may include nickel (Ni), copper (Cu), tin (Sn), palladium (Pd), platinum (Pt), gold (Au), silver (Ag), tungsten (W), titanium (Ti), lead (Pb), or alloys thereof. For example, the plating layer may be a nickel (Ni) plating layer or a tin (Sn) plating layer, may have a sequentially laminated form of the nickel (Ni) plating layer and the tin (Sn) plating layer, and may have a sequentially laminated form of the tin (Sn) plating layer, the nickel (Ni) plating layer, and the tin (Sn) plating layer. Additionally, the plating layer may include nickel (Ni) plating layers and/or tin (Sn) plating layers.

The plating layer may improve mountability of the multilayer ceramic capacitor 100 on the substrate, structural reliability, external durability, heat resistance, and equivalent series resistance (ESR).

A method of fabricating a multilayer ceramic capacitor 100 according to an embodiment will now be described.

The method of fabricating a multilayer ceramic capacitor 100 according to an embodiment may include: mixing a barium titanate-based main component powder and a secondary component powder including a magnesium (Mg)-containing compound to prepare a dielectric slurry; fabricating a dielectric green sheet using the dielectric slurry, and forming a conductive paste layer on a dielectric green sheet surface; fabricating a dielectric green sheet laminate by laminating the dielectric green sheets on which the conductive paste layer is formed; fabricating a capacitor body including a dielectric layer and an internal electrode layer by firing the dielectric green sheet laminate; and forming an external electrode on one side of the capacitor body.

First, the dielectric slurry is prepared by mixing the barium titanate-based main component powder and the secondary component powder including a magnesium (Mg)-containing compound.

The barium titanate-based main component powder is the same as the barium titanate-based main component included in the dielectric layer so its description will be omitted here.

The magnesium (Mg)-containing compound may be mixed in an amount of 0.01 parts by mole to 3 parts by mole based on 100 parts by mole of the barium titanate-based main component powder, for example, it may be mixed in an amount of 0.05 parts by mole to 1.5 parts by mole. When the magnesium (Mg)-containing compound is mixed within the content range, the Mg concentrated region C may be formed on the lost portion LP of the internal electrode layer, thereby reducing the concentration of Mg in the dielectric layer at the interface of the dielectric layer and the internal electrode layer. Therefore, as the phenomenon of excessive employment of the element of Mg in the dielectric layer as an acceptor is suppressed, the oxygen vacancy concentration decreases, and the potential barrier height at the interface of the dielectric layer and the internal electrode layer may increase, resulting in obtaining the multilayer ceramic capacitor with excellent accelerated life reliability.

The secondary component powder may further include a dysprosium (Dy)-containing compound, a terbium (Tb)-containing compound, a manganese (Mn)-containing compound, a vanadium (V)-containing compound, an aluminum (Al)-containing compound, a silicon (Si)-containing compound, a tin (Sn)-containing compound, or combinations thereof.

The secondary component powder may be an oxide or a salt compound, or may be used as a sol dispersed in an organic solvent.

The dysprosium (Dy)-containing compound may be included in an amount of 0.01 parts by mole to 5 parts by mole based on 100 parts by mole of the barium titanate-based main component powder, the terbium (Tb)-containing compound may be included in an amount of 0.01 parts by mole to 5 parts by mole based on 100 parts by mole of the barium titanate-based main component powder, the manganese (Mn)-containing compound may be included in an amount of 0.01 parts by mole to 5 parts by mole based on 100 parts by mole of the barium titanate-based main component powder, the vanadium (V)-containing compound may be included in an amount of 0.01 parts by mole to 5 parts by mole based on 100 parts by mole of the barium titanate-based main component powder, the aluminum (Al)-containing compound may be included in an amount of 0.01 parts by mole to 5 parts by mole based on 100 parts by mole of the barium titanate-based main component powder, the silicon (Si)-containing compound may be included in an amount of 0.01 parts by mole to 5 parts by mole based on 100 parts by mole of the barium titanate-based main component powder, and the tin (Sn)-containing compound may be included in an amount of 0.01 parts by mole to 5 parts by mole based on 100 parts by mole of the barium titanate-based main component powder. When the secondary component powder is included within the content range, the multilayer ceramic capacitor with high-capacity, high-reliability, and excellent voltage resistance characteristics may be obtained.

The dielectric slurry may also be prepared by additionally mixing additives such as a dispersant, a binder, a plasticizer, a lubricant, and an antistatic agent, and a solvent.

The dispersant may include, for example, a phosphoric acid ester-based dispersant, a polycarboxylic acid-based dispersant, or a combination thereof. The dispersant may be mixed in an amount of 0.1 parts by weight to 5 parts by weight based on 100 parts by weight of the barium titanate-based main component powder, for example, 0.3 parts by weight to 3 parts by weight. When the dispersant is mixed within the content range, the dispersion of the dielectric slurry may be excellent and the amount of impurities contained in the fabricated dielectric layer may be reduced.

The binder may be, for example, acryl resin, polyvinylbutyl resin, polyvinylacetal resin, ethyl cellulose resin, etc. The binder may be added in an amount of 0.1 parts by weight to 50 parts by weight based on 100 parts by weight of the barium titanate-based main component powder, for example, 3 parts by weight to 30 parts by weight. When the binder is mixed within the content range, dispersion of dielectric slurry may be excellent and the amount of impurities contained in the fabricated dielectric layer may be reduced.

The plasticizer may include, for example, phthalic acid-based compounds such as phthalic acid dioctyl, phthalic acid benzylbutyl, phthalic acid dibutyl, phthalic acid dihexyl, phthalic acid di (2-ethylhexyl), or phthalic acid di (2-ethylbutyl); adipic acid-based compounds such as adipic acid dihexyl or adipic acid di (2-ethylhexyl); glycolic compounds such as ethylene glycol, diethylene glycol, and triethylene glycol; and glycol ester-based compounds such as triethylene glycol dibutyrate, triethylene glycoldi (2-ethylbutylate), or triethylene glycoldi (2-ethylhexanoate), etc. The plasticizer may be added in an amount of 0.1 parts by weight to 20 parts by weight based on 100 parts by weight of the barium titanate-based main component powder, for example, 1 part by weight to 10 parts by weight. When the plasticizer is mixed within the content range, the dispersion of the dielectric slurry may be excellent and the amount of impurities contained in the fabricated dielectric layer may be reduced.

The solvent may be an aqueous solvent such as water; alcohol-based solvents such as ethanol, methanol, benzyl alcohol, and methoxyethanol; glycolic solvents such as ethylene glycol and diethylene glycol; ketone-based solvents such as acetone, methylethylketone, methyl isobutyl ketone, and cyclohexanone; ester-based solvents such as acetic acidbutyl, acetic acidethyl, carbitolacetate, or butylcarbitolacetate; ether-based solvents such as methyl cellosolve, ethyl cellosolve, butylether, or tetrahydrofuran; and aromatic solvents such as benzene, toluene, or xylene. The solvent may be an alcohol-based solvent or an aromatic-based solvent, considering the solubility or dispersion of various additives included in the dielectric slurry. The solvent may be mixed in an amount of 50 parts by weight to 1000 parts by weight based on 100 parts by weight of the barium titanate-based main component powder, for example, 100 parts by weight to 500 parts by weight. When the solvent is mixed within the content range, the dielectric slurry components may be sufficiently mixed, and subsequent removal of the solvent may be easy.

A wet ball mill or an agitate mill may be used to mix the barium titanate-based main component powder and secondary component powder. When using zirconia balls in the wet ball mill, the wet mixing may be performed for 8 hours to 48 hours or 10 hours to 24 hours, using the zirconia balls with a diameter of 0.1 mm to 10 mm.

The prepared dielectric slurry is formed into a dielectric layer when it is fired.

The methods for forming the prepared dielectric slurry into a sheet shape may include tape forming methods such as a doctor blade method and a calendar roll method, for example, it may use a head discharge type on-roll forming coater, and the dielectric green sheet may be obtained by drying a molded body.

To form a conductive paste layer that becomes an internal electrode layer after firing, the conductive paste may be prepared by mixing the conductive powder made of conductive metal or its alloy, the binder, and the solvent. If necessary, the barium titanate powder may be mixed together as a co-material. The co-materials may suppress sintering of the conductive powder during the firing process. The conductive paste is applied in a predetermined pattern to the dielectric green sheet surface using various printing or transfer methods such as a screen printing to form a conductive paste layer.

The conductive powder may include nickel (Ni) or an alloy of nickel (Ni).

A dielectric green sheet laminate is fabricated by laminating multiple layers of dielectric green sheets having formed the internal electrode pattern and then pressing them in the laminating direction. At this time, the dielectric green sheet and the internal electrode pattern may be laminated so that the dielectric green sheet is positioned on the upper and lower surfaces of the dielectric green sheet laminate in the laminating direction.

A process for cutting the fabricated dielectric green sheet laminate to a predetermined size by dicing, etc. may be optionally performed.

In addition, the dielectric green sheet laminate may be solidified and dried to remove the plasticizer, etc., as needed, and after it is solidified and dried, a barrel may be polished by using a horizontal centrifugal barrel device.

Regarding the barrel polishing, the dielectric green sheet laminate is put into a barrel container along with media and polishing liquid, and unnecessary parts such as burrs generated during cutting may be removed by applying rotation or vibration to the barrel container. Additionally, after polishing the barrel, the dielectric green sheet laminate may be washed and dried with a cleaning solution such as water.

The capacitor body may be fabricated by removing the binder and firing the dielectric green sheet laminate.

The binder removal processing conditions may be appropriately adjusted depending on the components of the dielectric layer or the internal electrode layer. For example, a temperature increasing rate during the binder removal may be 5° C./hour to 300° C./hour, a support temperature may be 180° C. to 400° C., and a temperature maintenance time may be 0.5 hours to 24 hours. An atmosphere during the binder removal process may be air or a reducing atmosphere.

The conditions of the firing process may be appropriately adjusted depending on the main component composition of the dielectric layer or the main component composition of the internal electrode. For example, the firing may be performed at a temperature of 1100° C. to 1400° C., for example, 1200° C. to 1350° C. Also, the firing may be performed for 0.5 hours to 8 hours, for example, 1 hour to 3 hours. The firing may also be performed in the reducing atmosphere, for example, an atmosphere humidifying mixed gases of nitrogen and hydrogen. When the internal electrode includes nickel (Ni) or an alloy of nickel (Ni), an oxygen partial pressure in the firing atmosphere may be $1.0 \times 10^{-14}$ MPa to $1.0 \times 10^{-10}$ MPa.

After the firing process, an annealing may be performed as needed. An annealing is a process for re-oxidizing the dielectric layer, and the annealing may be performed when the firing is performed in the reducing atmosphere. The conditions of annealing process may also be appropriately adjusted depending on the components of the dielectric layer. For example, the temperature during the annealing may be 950° C. to 1150° C., the time may be 0 hours to 20 hours, and the temperature increasing rate may be 50° C./hour to 500° C./hour. The annealing atmosphere may be a humidifying nitrogen gas N2 atmosphere, and the oxygen partial pressure may be $1.0 \times 10^{-9}$ MPa to $1.0 \times 10^{-5}$ MPa.

In the binder removal process, the firing process, or the annealing process, a wetter, for example, may be used to humidify nitrogen gas or mixed gas, etc., and in this case, the water temperature may be 5° C. to 75° C. The binder removal process the firing process, and the annealing process may be performed continuously or independently.

Surface processes such as a sandblasting process, a laser irradiation process, and a barrel polishing process may be performed on the third side and the fourth side of the selectively fabricated capacitor body 110. By performing this surface process, ends of the first internal electrode and the second internal electrode may be exposed on outermost surfaces of the third side and the fourth side so an electrical junction between the first external electrode and the second external electrode and the first internal electrode and the second internal electrode may increase, and an alloy portion may be easily formed.

An external electrode is formed on one side of the fabricated capacitor body 110.

For example, the sintered metal layer may be formed by applying a paste for forming a sintered metal layer with an external electrode and then sintering it.

The paste for forming a sintered metal layer may include a conductive metal and glass. The descriptions of the conductive metal and the glass are the same as those described above so repeated descriptions will be omitted. The paste for forming a sintering metal layer may optionally include a binder, a solvent, a dispersant, a plasticizer, oxide powder, etc. The binder may use, for example, ethyl cellulose, acryl, butyral (butyral), etc., and the solvent may use an organic solvent or aqueous solvent, for example, terpineol, butylcarbitol, alcohol, methylethylketone, acetone, toluene, etc.

Methods for applying a paste for forming a sintered metal layer to an outer surface of the capacitor body 110 may include various printing methods such as a dip method and a screen printing, an applying method using a dispenser, etc., and a spraying method using a spray. The paste for forming a sintered metal layer may be applied to at least the third side and the fourth side of the capacitor body 110, and may be optionally applied to portions of the first side, the second side, the fifth side, or the sixth side where the bands of the first external electrode and the second external electrode are formed.

The capacitor body 110 coated with the paste for forming the sintered metal layer is dried and is then sintered at the temperature of 700° C. to 1000° C. for 0.1 to 3 hours to form the sintered metal layer.

Optionally, a paste for forming a conductive resin layer may be applied to an outer surface of the obtained capacitor body 110 and may then be cured to form a conductive resin layer.

The paste for forming a conductive resin layer may include resin and may optionally include a conductive metal or a non-conductive filler. The description of the conductive metal and the resin is the same as those described above so repeated descriptions will be omitted. The paste for forming a conductive resin layer may optionally include a binder, a solvent, a dispersant, a plasticizer, oxide powder, etc. The binder may use, for example, ethyl cellulose, acryl, and butyral, and the solvent may use an organic solvent or an aqueous solvent such as terpineol, butylcarbitol, alcohol, methylethylketone, acetone, and toluene.

For example, the conductive resin layer may be formed by dipping the capacitor body 110 into the paste for forming a conductive resin layer and curing the same, printing the paste for forming a conductive resin layer on a surface of the capacitor body 110 by the screen printing or the gravure printing, or applying the paste for forming a conductive resin layer to the surface of the capacitor body 110 and curing the same.

A plating layer is formed on the outside of the conductive resin layer.

For example, the plating layer may be formed by a plating method, or may be formed by a sputter or an electric deposition.

The above-described implementation example will be described in more detail through the following embodiment. However, the following embodiments are for illustrative purposes only and do not limit the scope.

(Fabricating a Multilayer Ceramic Capacitor)

Example 1 and Comparative Example 1

The dielectric slurry is prepared by mixing the barium titanate ($BaTiO_3$) as main component powder, and 1.5 parts by mole of a magnesium oxide (MgO), 3 parts by mole of a dysprosium oxide ($Dy_2O_3$), 1.5 parts by mole of a terbium oxide ($Tb_2O_3$), 1 part by mole of a manganese oxide ($MnO_2$), 1 part by mole of a vanadium oxide ($V_2O_5$), 1 part by mole of the aluminum oxide ($Al_2O_3$), 3 parts by mole of a silicon oxide ($SiO_2$), and 1 part by mole of a tin oxide ($SnO_2$) as secondary component powder. The content of each secondary component powder was based on 100 parts by mole of the barium titanate main component powder. At this time, the mixing is performed by adding ethanol/toluene and polyvinyl butyral (PVB) resin as a wetting dispersant and a binder together by using a zirconia ball ($ZrO_2$ ball) as a dispersing medium, and then performing a mechanical milling.

The dielectric green sheet was fabricated from the prepared dielectric slurry using a head discharge type on-roll forming coater.

A conductive paste layer including nickel (Ni) is printed on the surface of the dielectric green sheet, and the dielectric green sheet (horizontal X vertical X height=3.2 mm×2.5 mm×2.5 mm) on which the conductive paste layer is formed is laminated and compressed to fabricate a dielectric green sheet laminate.

The fabricated dielectric green sheet laminate undergoes a plasticization process at 400° C. or lower and a nitrogen atmosphere, and is fired in the conditions of the firing temperature of 1150° C. to 1250° C. and the hydrogen ($H_2$) concentration of 0.8% or lower in the case of Example 1, and is fired in the conditions of the firing temperature of 1100° C. to 1140° C. and the hydrogen ($H_2$) concentration of 0.9% or higher in the case of Comparative Example 1.

The multilayer ceramic capacitor was fabricated through a process such as plating an external electrode.

Estimation 1: TEM-EDS Analysis

Figure 5A:
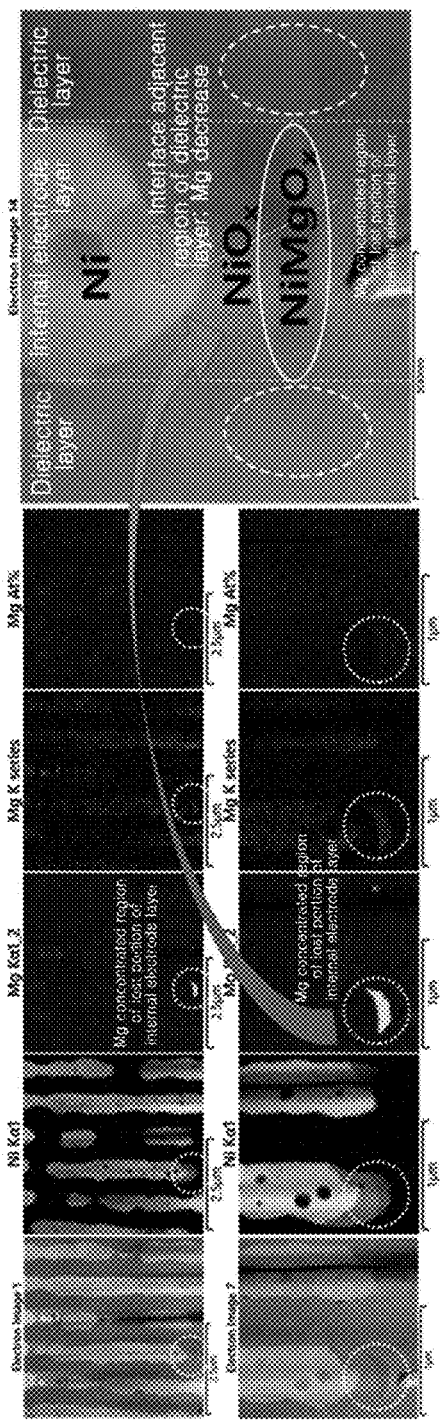
FIG. 5A shows a TEM-EDS analysis image of an active region of a multilayer ceramic capacitor according to Example 1.
Figure 5B:
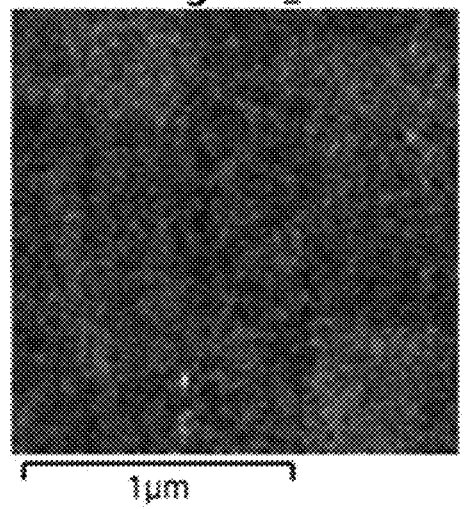
FIG. 5B shows a TEM-EDS analysis image of an active region of a multilayer ceramic capacitor according to Comparative Example 1.

A TEM-EDS (transmission electron microscope-energy dispersive spectrometer) analysis was performed on the multilayer ceramic capacitor fabricated in Example 1 and Comparative Example 1, and results are shown in FIG. 5A and FIG. 5B.

The TEM-EDS analysis is measured using the following method. The multilayer ceramic capacitor fabricated according to Example 1 and Comparative Example 1 is put into an epoxy mixed solution and is cured, the surface (LT surface) of the capacitor body in the L-axis and T-axis directions is polished by the ½ depth in the W-axis direction, it is fixed, it is maintained in a vacuous atmosphere chamber to obtain the cross-sectional sample so that the active region in which the dielectric layer crosses the internal electrode layer may be observed. A lateral portion of the active region (region A in FIG. 2) of the cross-sectional sample was measured using a TEM. The TEM measured using the Xe-FIB (focused ion beam) under the conditions of the acceleration voltage of 200 kV and the analysis magnification of 110k times so that six dielectric layers and six internal electrode layers are visible, respectively.

In the TEM image of the measured cross-sectional sample, the formation of the Mg concentrated region in the lost portion of the internal electrode layer is confirmed through an EDS mapping analysis, and results are shown in FIG. 5A and FIG. 5B.

FIG. 5A shows a TEM-EDS analysis image of an active region of a multilayer ceramic capacitor according to Example 1, and FIG. 5B shows a TEM-EDS analysis image of an active region of a multilayer ceramic capacitor according to Comparative Example 1.

Referring to FIG. 5A, in the case of Example 1 according to an embodiment, it may be found that the Mg concentrated region including the element of Mg as the main element is formed in the lost portion of the internal electrode layer, that is, a region where the continuity of the internal electrode layer is broken. It may be found that the element of Mg exists in the interface adjacent region in the dielectric layer, which is adjacent to the Mg concentrated region and near the interface between the dielectric layer and the internal electrode layer. At this time, it may be found that the element of Mg existing in the interface adjacent region in the dielectric layer has a lower concentration, that is, a lower atom % content, than the element of Mg existing in the Mg concentrated region of the lost portion of the internal electrode layer.

On the other hand, Referring to FIG. 5B, in the case of Comparative Example 1 fabricated under firing conditions that are different from those of Example 1, it may be seen that the Mg concentrated region is not well formed in the lost portion of the internal electrode layer.

Estimation 2: EDS-Line Profile Analysis

Figure 6:
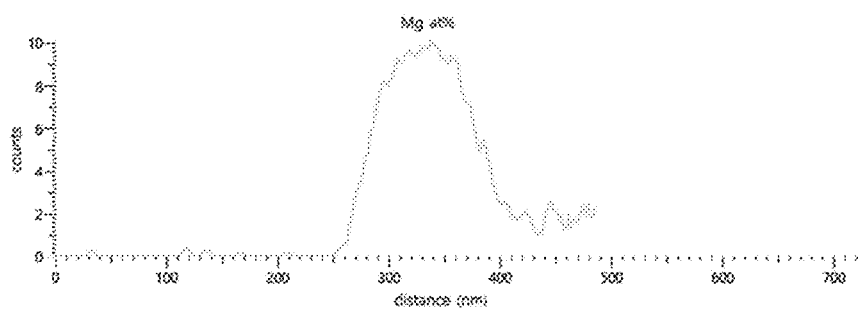
FIG. 6 shows an EDS-line profile analysis graph on an interface of a dielectric layer and an internal electrode layer of a multilayer ceramic capacitor according to Example 1.

An energy dispersive fluorescence spectroscopy (EDS) line profile analysis was performed on the multilayer ceramic capacitor fabricated in Example 1, and results are shown in FIG. 6.

In detail, in the TEM image of the cross-sectional sample measured in Evaluation 1, the EDS line profile analysis is performed from the internal electrode layer to the dielectric layer to check changes in concentration of the atom % of the element of Mg in the interface adjacent region of the dielectric layer and the Mg concentrated region, and results are shown in FIG. 6.

FIG. 6 shows an EDS-line profile analysis graph on an interface of a dielectric layer and an internal electrode layer of a multilayer ceramic capacitor according to Example 1.

Referring to FIG. 6, the region from 0 nm to 250 nm, where the concentration of the element of Mg converges to 0, is a portion with continuity of the internal electrode layer, and the region from 270 nm to 400 nm, where the concentration of the element of Mg increases, corresponds to a portion of the lost portion of the internal electrode layer, and the region from 400 nm to 480 nm, where the concentration of the element of Mg decreases, corresponds to the interface adjacent region of the dielectric layer. By this, it may be confirmed that there is an Mg concentrated region in which the concentration of the element of Mg increases in the lost portion of the internal electrode layer, and it may be found that the concentration of the element of Mg is relatively decreased in the interface adjacent region of the dielectric layer in the case of Example 1 according to an embodiment. From this, it may be seen that the phenomenon of excessive employment of the element of Mg in the dielectric material as an acceptor is suppressed at the interface between the dielectric layer and the internal electrode layer, and the potential barrier height increases accordingly.

Estimation 3: Accelerated Life Reliability

Figure 7:
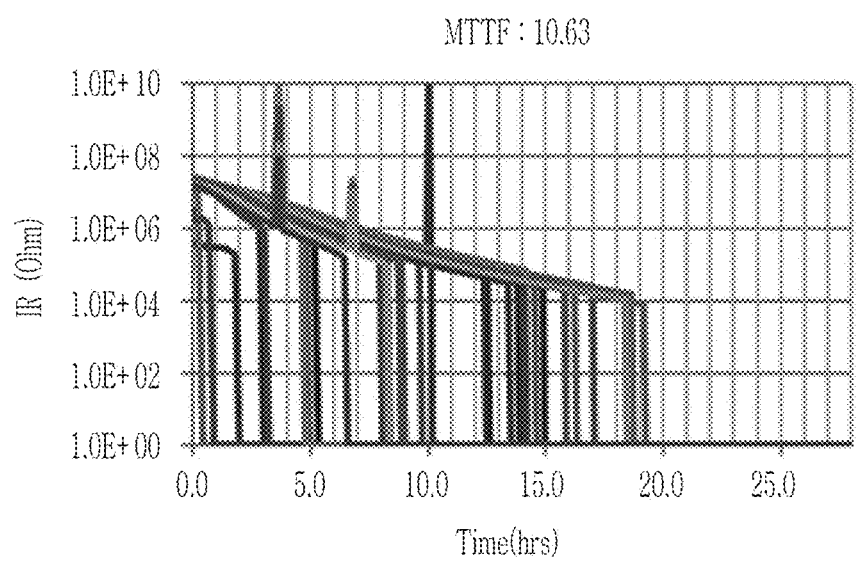
FIG. 7 shows a graph of accelerated life reliability of a multilayer ceramic capacitor according to Example 1.
Figure 8:
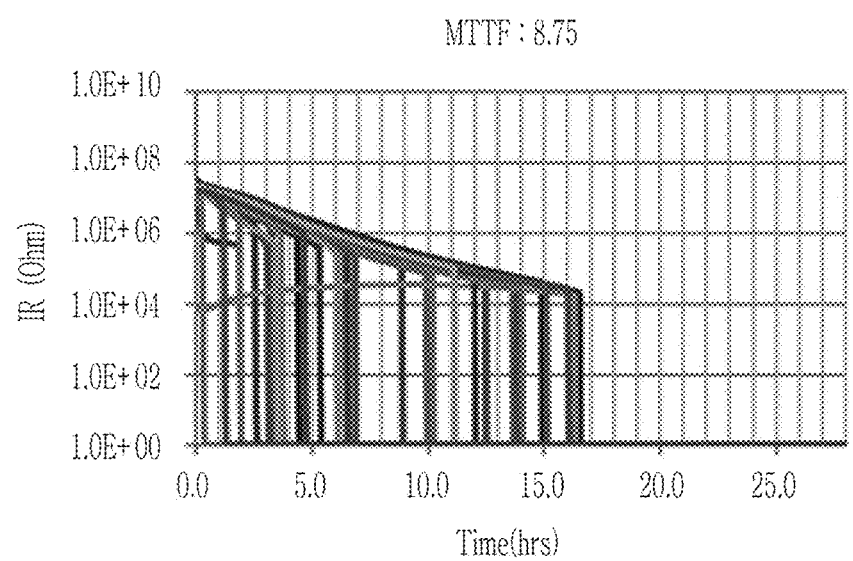
FIG. 8 shows a graph of accelerated life reliability of a multilayer ceramic capacitor according to Comparative Example 1.

The reliability of the following items for the multilayer ceramic capacitor fabricated according to Example 1 and Comparative Example 1 is measured, and results are shown in FIG. 7 and FIG. 8.

MTTF (mean time to failure): After mounting 40 sample chips on a reliability substrate, the mean time to failure (hr) is obtained by measuring under the conditions of the temperature of 125° C., the voltage of 9.45V, and 48 hours.

FIG. 7 shows a graph of accelerated life reliability of a multilayer ceramic capacitor according to Example 1, and FIG. 8 shows a graph of accelerated life reliability of a multilayer ceramic capacitor according to Comparative Example 1.

Referring to FIG. 7 and FIG. 8, in the case of Example 1, in which the Mg concentrated region exists in the lost portion of the internal electrode layer and the concentration of the element of Mg is relatively reduced in the interface adjacent region of the dielectric layer, accelerated life reliability is found to be superior to Comparative Example 1.

While this invention has been described in connection with what is presently practical embodiments, it is to be understood that the invention is not limited to the disclosed embodiments, but, on the contrary, is intended to cover various modifications and equivalent arrangements included within the spirit and scope of the appended claims.

What is claimed is:

1. A multilayer ceramic capacitor comprising:
a capacitor body including a dielectric layer and an internal electrode layer; and
an external electrode disposed on the capacitor body,
wherein the capacitor body includes at least one lost portion defined as a region in which continuity of the internal electrode layer is disconnected, and the lost portion includes a Mg concentrated region including magnesium (Mg) as a main element,
the dielectric layer includes an interface adjacent region defined to be a region from an interface of the dielectric layer and the internal electrode layer to a depth surface of 80 nm to 100 nm into the dielectric layer, and the interface adjacent region includes magnesium (Mg), and
the magnesium (Mg) included in the interface adjacent region of the dielectric layer has a lower atom % content than the magnesium (Mg) included in the Mg concentrated region of the lost portion.

2. The multilayer ceramic capacitor of claim 1, wherein the magnesium (Mg) included in the Mg concentrated region of the lost portion is included in an amount of 1.6 atom % to 11.1 atom % based on a total amount of components of the Mg concentrated region.

3. The multilayer ceramic capacitor of claim 1, wherein the Mg concentrated region of the lost portion further includes barium (Ba), titanium (Ti), nickel (Ni), dysprosium (Dy), terbium (Tb), manganese (Mn), vanadium (V), aluminum (Al), silicon (Si), tin (Sn), oxygen (O), or combinations thereof.

4. The multilayer ceramic capacitor of claim 3, wherein the Mg concentrated region of the lost portion includes the titanium (Ti), and
the magnesium (Mg) included in the Mg concentrated region of the lost portion is included in an amount of 12.68 parts by mole to 22000 parts by mole based on 100 parts by mole of the titanium (Ti) in the Mg concentrated region of the lost portion.

5. The multilayer ceramic capacitor of claim 3, wherein the Mg concentrated region of the lost portion includes the nickel (Ni), and
the magnesium (Mg) included in the Mg concentrated region of the lost portion is included in an amount of 4.75 parts by mole to 71.58 parts by mole based on 100 parts by mole of the nickel (Ni) in the Mg concentrated region of the lost portion.

6. The multilayer ceramic capacitor of claim 1, wherein the magnesium (Mg) included in the Mg concentrated region of the lost portion is included in a mole ratio of 1.010 to 13.701 compared to the magnesium (Mg) included in the interface adjacent region of the dielectric layer.

7. The multilayer ceramic capacitor of claim 1, wherein the magnesium (Mg) included in the Mg concentrated region of the lost portion and one of nickel (Ni) and oxygen (O) have a secondary phase.

8. The multilayer ceramic capacitor of claim 1, wherein the magnesium (Mg) included in the interface adjacent region of the dielectric layer is included in an amount of 0.8 atom % to 4.2 atom % based on a total amount of components of the interface adjacent region.

9. The multilayer ceramic capacitor of claim 1, wherein the interface adjacent region of the dielectric layer further includes barium (Ba), titanium (Ti), nickel (Ni), dysprosium (Dy), terbium (Tb), manganese (Mn), vanadium (V), aluminum (Al), silicon (Si), tin (Sn), oxygen (O), or combinations thereof.

10. The multilayer ceramic capacitor of claim 9, wherein the interface adjacent region of the dielectric layer includes the titanium (Ti), and the magnesium (Mg) included in the interface adjacent region of the dielectric layer is included in an amount of 5.0 parts by mole to 29.7 parts by mole based on 100 parts by mole of the titanium (Ti) of the interface adjacent region of the dielectric layer.

11. A method of fabricating a multilayer ceramic capacitor comprising:
preparing dielectric slurry by mixing a barium titanate-based main component powder and a secondary component powder including a magnesium (Mg)-containing compound;
fabricating a dielectric green sheet by using the dielectric slurry, and forming a conductive paste layer on a surface of the dielectric green sheet;
fabricating a dielectric green sheet laminate by laminating the dielectric green sheet on which the conductive paste layer is formed;
fabricating a capacitor body including a dielectric layer and an internal electrode layer by firing the dielectric green sheet laminate; and
forming an external electrode on one side of the capacitor body,
wherein the capacitor body includes at least one lost portion defined as a region in which continuity of the internal electrode layer is disconnected, and the lost portion includes a Mg concentrated region including magnesium (Mg) as a main element,
the dielectric layer includes an interface adjacent region defined to be a region from an interface of the dielectric layer and the internal electrode layer to a depth surface of 80 nm to 100 nm into the dielectric layer, and the interface adjacent region includes magnesium (Mg), and
the magnesium (Mg) included in the interface adjacent region of the dielectric layer has a lower atom % content than the magnesium (Mg) included in the Mg concentrated region of the lost portion.

12. The method of claim 11, wherein the magnesium (Mg)-containing compound is mixed in an amount of 0.01 parts by mole to 3 parts by mole based on 100 parts by mole of the barium titanate-based main component powder.

13. The method of claim 11, wherein the secondary component powder further includes a dysprosium (Dy)-containing compound, a terbium (Tb)-containing compound, a manganese (Mn)-containing compound, a vanadium (V)-containing compound, an aluminum (Al)-containing compound, a silicon (Si)-containing compound, a tin (Sn)-containing compound, or combinations thereof.

14. The method of claim 13, wherein based on 100 parts by mole of the barium titanate-based main component powder:
the dysprosium (Dy)-containing compound is included in an amount of 0.01 parts by mole to 5 parts by mole,
the terbium (Tb)-containing compound is included in an amount of 0.01 parts by mole to 5 parts by mole,
the manganese (Mn)-containing compound is included in an amount of 0.01 parts by mole to 5 parts by mole,
the vanadium (V)-containing compound is included in an amount of 0.01 parts by mole to 5 parts by mole,
the aluminum (Al)-containing compound is included in an amount of 0.01 parts by mole to 5 parts by mole,
the silicon (Si)-containing compound is included in an amount of 0.01 parts by mole to 5 parts by mole, and
the tin (Sn)-containing compound is included in an amount of 0.01 parts by mole to 5 parts by mole.

15. The method of claim 11, wherein the conductive paste layer is fabricated from a conductive paste including nickel (Ni).

* * * * *